(12) United States Patent
Tigér

(10) Patent No.: US 9,709,107 B2
(45) Date of Patent: Jul. 18, 2017

(54) BEARING BRACKET CONFIGURATION FOR DRUM BRAKE AND METHOD FOR ASSEMBLING A BEARING BRACKET CONFIGURATION

(71) Applicant: SCANIA CV AB, Södertälje (SE)

(72) Inventor: Rickard Tigér, Stockholm (SE)

(73) Assignee: SCANIA CV AB (SE)

(*) Notice: Subject to any disclaimer, the term of this patent is extended or adjusted under 35 U.S.C. 154(b) by 0 days.

(21) Appl. No.: 14/412,735

(22) PCT Filed: Jun. 28, 2013

(86) PCT No.: PCT/SE2013/050811
§ 371 (c)(1),
(2) Date: Jan. 5, 2015

(87) PCT Pub. No.: WO2014/007731
PCT Pub. Date: Jan. 9, 2014

(65) Prior Publication Data
US 2015/0167762 A1    Jun. 18, 2015

(30) Foreign Application Priority Data
Jul. 5, 2012   (SE) ........................ 1250772

(51) Int. Cl.
*F16D 65/00* (2006.01)
*F16D 51/00* (2006.01)
(Continued)

(52) U.S. Cl.
CPC ......... *F16D 65/0056* (2013.01); *F16D 51/00* (2013.01); *F16D 51/22* (2013.01);
(Continued)

(58) Field of Classification Search
CPC ............................. F16D 65/00; F16D 65/0056
See application file for complete search history.

(56) References Cited

U.S. PATENT DOCUMENTS 2,619,202 A * 11/1952 Buckendale ............ F16D 65/22
188/205 R
3,465,603 A * 9/1969 Lindstrom .............. F16D 65/50
188/79.55
(Continued)

FOREIGN PATENT DOCUMENTS

CN   1119713 A   4/1996
CN   1434903 A   8/2003
(Continued)

OTHER PUBLICATIONS

International Search Report dated Oct. 7, 2013 issued in corresponding International patent application No. PCT/SE2013/050811.
(Continued)

*Primary Examiner* — Bradley King
*Assistant Examiner* — James Hsiao
(74) *Attorney, Agent, or Firm* — Ostrolenk Faber LLP

(57) ABSTRACT

A bearing bracket configuration for a drum brake of a motor vehicle. A bearing bracket (30) for an eccentric shaft (20) is provided with a separate mounting (50) for the brake cylinder (10). This makes it possible for the fastening to be divided into separate parts, whereby accessibility for fitting is improved and it is possible for the parts to be largely preassembled. Also, a drum brake and a motor vehicle with the configuration and a method for fitting a bearing bracket configuration are disclosed.

9 Claims, 5 Drawing Sheets

(51) Int. Cl.
*F16D 51/22* (2006.01)
*F16D 51/24* (2006.01)
*F16D 125/28* (2012.01)
*F16D 125/64* (2012.01)

(52) U.S. Cl.
CPC ........ F16D 51/24 (2013.01); *F16D 2051/003* (2013.01); *F16D 2125/28* (2013.01); *F16D 2125/64* (2013.01); *Y10T 29/49826* (2015.01)

(56) References Cited

U.S. PATENT DOCUMENTS

| | | | | |
|---|---|---|---|---|
| 3,830,343 | A * | 8/1974 | Gardner | B60T 1/065 188/217 |
| 3,942,610 | A * | 3/1976 | Klaue | B60T 1/065 188/264 G |
| 4,014,411 | A * | 3/1977 | Troester | F16D 65/18 188/196 BA |
| 4,022,300 | A * | 5/1977 | Afanador | F16D 55/224 188/71.9 |
| 4,036,329 | A * | 7/1977 | Anderson | F16D 55/224 188/72.7 |
| 4,036,330 | A * | 7/1977 | Henning | F16D 55/224 188/72.8 |
| 4,497,392 | A * | 2/1985 | Stensson | B61H 5/00 188/59 |
| 4,529,067 | A * | 7/1985 | Scott | F16D 55/26 188/18 A |
| 4,644,812 | A * | 2/1987 | Nelson | F16D 65/60 188/196 M |
| 5,046,589 | A * | 9/1991 | Bright | F16D 65/22 188/205 A |
| 5,477,945 | A * | 12/1995 | Klass | B60T 1/067 188/79.51 |
| 5,819,885 | A * | 10/1998 | Griffiths | F16D 65/28 188/71.9 |
| 5,887,687 | A | 3/1999 | Williams | 188/330 |
| 2009/0200858 | A1 * | 8/2009 | Iwaki | B60K 7/0015 303/11 |

FOREIGN PATENT DOCUMENTS

EP        0 677 678 A2    10/1995
WO       WO 01/46600 A1    6/2001

OTHER PUBLICATIONS

International Preliminary Report on Patentability dated May 27, 2014 issued in corresponding International patent application No. PCT/SE2013/050811.

Supplementary European Search Report, dated Jan. 20, 2016, issued in corresponding European Patent Application No. EP13813144. Total 2 pages.

Office Action dated Nov. 30, 2016 issued in corresponding Chinese Patent Application No. 201380035009.X with English translation.

* cited by examiner

BEARING BRACKET CONFIGURATION FOR DRUM BRAKE AND METHOD FOR ASSEMBLING A BEARING BRACKET CONFIGURATION

CROSS-REFERENCE TO RELATED APPLICATIONS

The present application is a 35 U.S.C. §§371 National Phase conversion of PCT/SE2013/050811, filed Jun. 28, 2013, which claims priority of Swedish Patent Application No. 1250772-9, filed Jul. 5, 2012, the contents of which are incorporated by reference herein. The PCT International Application was published in the English language.

TECHNICAL FIELD

The invention relates to a bearing bracket configuration for drum brakes, to a drum brake and to a motor vehicle with these features. It also relates to a method for assembling a bearing bracket configuration.

BACKGROUND

Drum brakes on rear axles of at least large motor vehicles comprise a brake cylinder, a brake lever arm connected to the brake cylinder, and an eccentric shaft connected to the brake lever arm and provided with an S cam, whereby during braking the braking force is arranged to be transmitted from the brake cylinder to the brake lever arm, which rotates the eccentric shaft so that the S cam turns and thereby pushes out the brake shoes which then press upon the brake drum to brake the vehicle.

In prior art the drum brake is installed close to the rear axle via a bearing bracket which is fastened to the rear axle and configured to journalling the eccentric shaft and serving as a mounting for the brake cylinder.

Assembly involves first fastening the bearing bracket to the rear axle and then fitting the other parts by successively connecting the eccentric shaft to the bearing bracket, the brake lever arm to the eccentric shaft and the brake cylinder to the bearing bracket.

Such fastening by means of the bearing bracket results in inefficient fitting of the drum brake to the rear axle, inter alia because of limited accessibility and limited scope for preassembly.

OBJECT OF THE INVENTION

An object of the present invention is to propose a bearing bracket configuration for a drum brake of a motor vehicle which makes it easier, inter alia by possible preassembly, to fit the drum brake's brake lever arm, eccentric shaft and brake cylinder.

SUMMARY OF THE INVENTION

This and other objects indicated by the description set out below are achieved by a bearing bracket configuration, a drum brake and a motor vehicle of the kind indicated in the introduction which further present the features disclosed herein.

Using a separate bearing bracket for the eccentric shaft and separate brake cylinder fastening means allows efficient fitting of the drum brake's eccentric shaft, brake cylinder and brake lever arm. Access to threaded connections is thus facilitated by clear paths for tools, resulting in easier fitting to the rear axle. It is also possible to preassemble parts of the installation, which may take place off the main assembly line, thereby making fitting still more efficient. A further possibility is that various parts of the installation may be fitted at different stations on the assembly line, resulting in better balancing of production in that not all fitting need take place at the same assembly station, since various parts may be spread over the process of axle assembly, making it possible to break fitting down into smaller portions and thereby optimise assembly cycle times.

In one embodiment said bearing bracket is arranged to be fastened to the vehicle's rear axle close to said drum brake, making it possible to arrange the parts of the drum brake efficiently as regards space.

In one embodiment said bearing bracket is configured to be part of an assembly package comprising said eccentric shaft, a brake lever arm connected to the eccentric shaft, and an eccentric configuration, resulting in more efficient fitting on the assembly line.

In one embodiment said brake cylinder fastening means is configured to be part of an assembly package comprising said brake cylinder, resulting in more efficient fitting on the assembly line.

The invention thus makes it possible for parts to be largely preassembled, thereby facilitating fitting.

DESCRIPTION OF DRAWINGS

The present invention will be better understood by reading the detailed description set out below in conjunction with the attached drawings, in which the same reference notations are used for similar parts throughout the various views, FIG. 1 schematically illustrates a motor vehicle according to an embodiment of the present invention.

DESCRIPTION OF EMBODIMENTS

Figure 1:
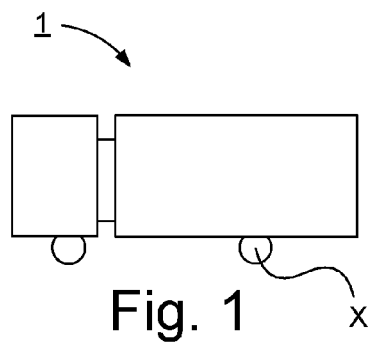

FIG. 1 illustrates schematically a motor vehicle 1 according to an embodiment of the present invention. The vehicle here exemplified is a heavy vehicle in the form of a truck. It has a powered rear axle X connected to tractive rear wheels and provided with an arrangement in the form of a bearing bracket configuration for the rear axle's drum brakes. In alternative embodiments the invention may also be used on non-tractive, non-steerable wheels.

Figure 2A:
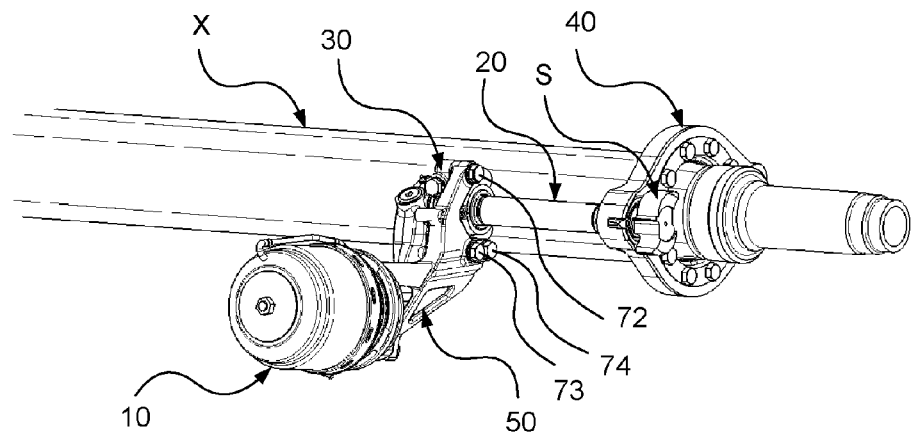
FIGS. 2a-2b are different schematic perspective views of part of a rear axle with part of a drum brake comprising a bearing bracket configuration according to the present invention.
Figure 2B:
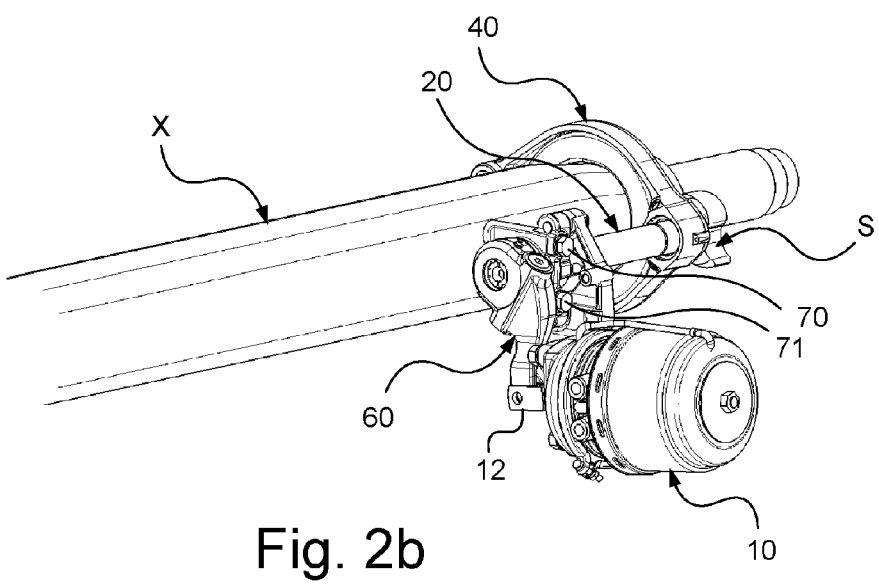
Figure 3A:
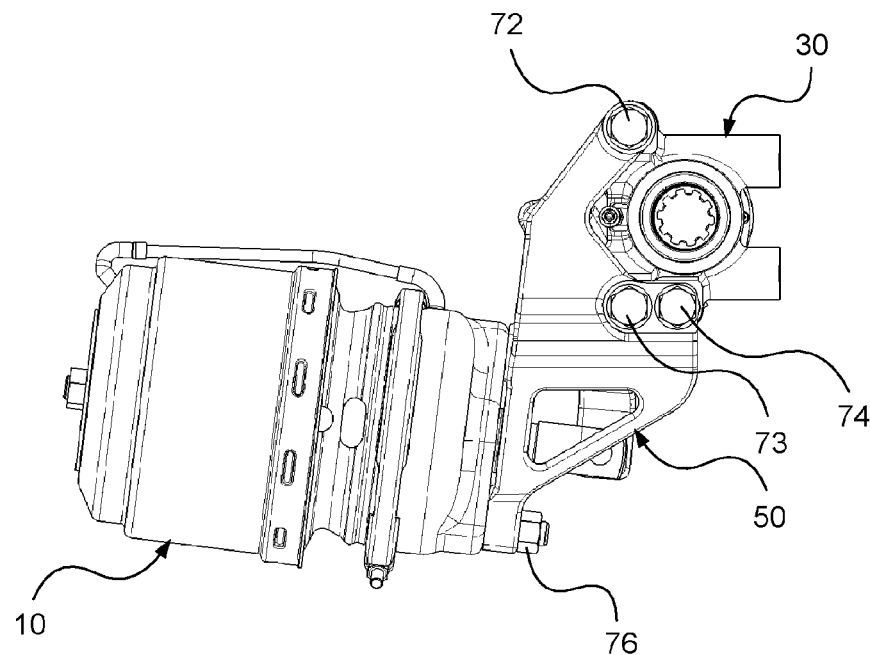
FIGS. 3a-b are different schematic side views of the bearing bracket configuration in FIGS. 2a-b with brake cylinder and brake lever arm.
Figure 3B:
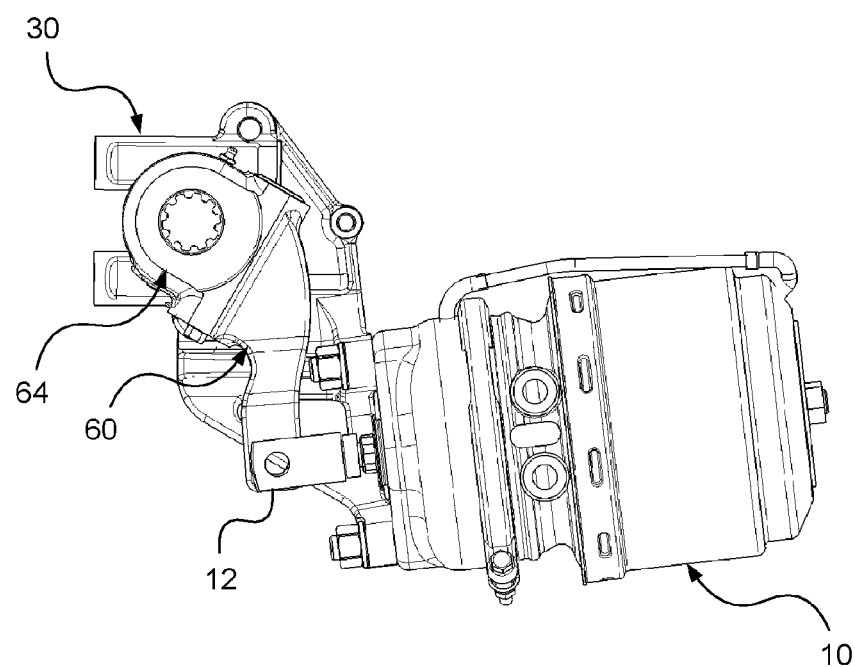

FIGS. 2a-2b are different schematic perspective views of part of a rear axle X with part of a drum brake comprising a bearing bracket configuration for a drum brake of a motor vehicle according to the present invention, and FIGS. 3a-b are different schematic side views of the bearing bracket configuration in FIGS. 2a-b with brake cylinder 10 and eccentric shaft 20.

The bearing bracket configuration is arranged for journalled fastening of an eccentric shaft 20 of said drum brake and for fastening of a brake cylinder 10 of said drum brake.

The bearing bracket configuration comprises a bearing bracket 30 for said journalled fastening of an eccentric shaft 20. Said bearing bracket is adapted to being fastened to the vehicle's rear axle X close to said drum brake.

The eccentric shaft 20 is thus journalled by said bearing bracket. The eccentric shaft is connected to a substantially annular eccentric configuration 40 placed round said rear axle X close to an undepicted brake drum of said drum brake.

Said eccentric shaft 20 is arranged to run substantially parallel with and at a distance from the rear axle X, i.e. eccentrically relative to the rear axle X. Said eccentric shaft is journalled by a bearing 42 in said eccentric configuration. Said eccentric shaft is connected to a substantially S-shaped cam, referred to as the cam S. In one variant said cam S is an integral part of said eccentric shaft.

The bearing bracket configuration comprises a separate brake cylinder fastening means 50 for said fastening of a brake cylinder 10 which is part of said drum brake.

Said bearing bracket 30 is adapted to accommodating said separate brake cylinder fastening means 50 for said fastening of a brake cylinder 10. Said brake cylinder fastening means is adapted accordingly to being fastened to said bearing bracket.

Said drum brake comprises a brake lever arm 60. Said brake lever arm has in its lower end region a lower fastening portion 62 provided with a fastening aperture 62a and connected pivotably to a fastening portion 12 of the brake cylinder 10, and in its opposite upper end region an upper fastening portion 64 connected to, for rotation of, said eccentric shaft 20.

During braking, the braking force is arranged to be transmitted from the brake cylinder 10 to the brake lever arm 60 which rotates the eccentric shaft 20 so that the cam S turns and thereby pushes out undepicted brake shoes of the drum brake which during said braking are adapted to pressing upon the drum brake's undepicted brake drum to brake the vehicle.

Figure 4:
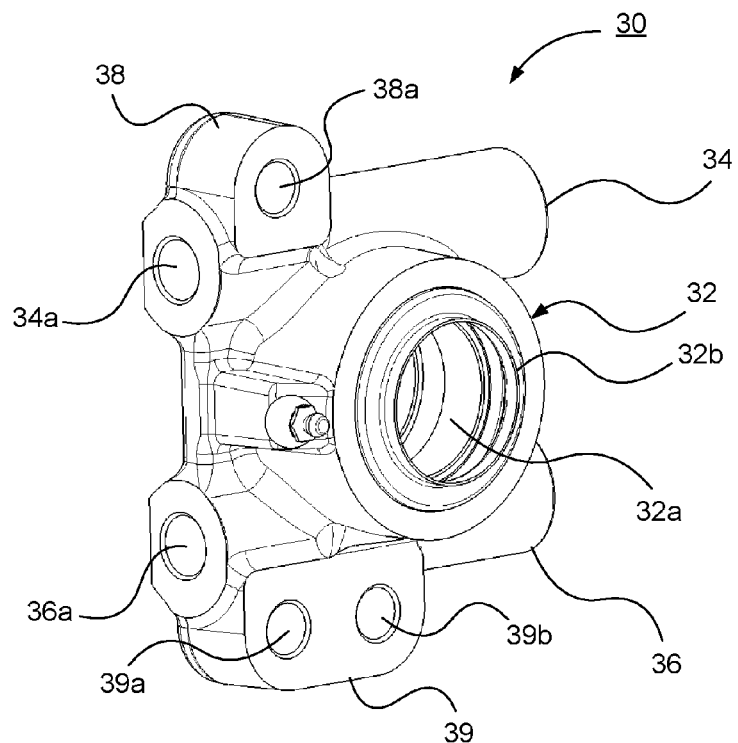
FIG. 4 is a schematic perspective view of a bearing bracket from the bearing bracket configuration in FIGS. 2a-b.

FIG. 4 is a schematic perspective view of said bearing bracket 30 which is part of the bearing bracket configuration in FIGS. 2a-b.

The bearing bracket 30 has a central bearing portion 32 which has running through it a circular bearing aperture 32a surrounded by a bearing 32b to journal said eccentric shaft 20.

The bearing bracket further has an upper region situated above the central bearing portion 32 and a lower region situated below the central bearing portion.

The bearing bracket has in the upper region an upper shaft fastening portion 34 for fastening to said rear axle X and provided with an upper shaft fastening aperture 34a running through it and arranged to run above and substantially at right angles to the axial extent of said bearing aperture 32a.

The bearing bracket has in the lower region a lower axle fastening portion 36 for fastening to said rear axle X and provided with a lower axle fastening portion 36a running through it and adapted to running below and substantially at right angles to the axial extent of said bearing aperture 32a and parallel with said upper shaft fastening aperture 34a.

Said bearing bracket 30 is adapted to being fastened to said rear axle X by means of fastening elements situated in said upper and lower shaft fastening apertures 34a, 36a in the form of threaded connections 70, 71, depicted inter alia in FIG. 2b. Said upper and lower shaft fastening portions 34, 36 and consequently said upper and lower shaft fastening apertures 34a, 36a have at right angles to the axial extent of the bearing aperture 32a an extent which is greater than the radial extent of the central bearing portion 32 and the bearing aperture 32a in corresponding directions so that when fastened to the rear axle X the eccentric shaft 20 placed in the bearing aperture 32a runs parallel with and at a distance from the rear axle X.

The bearing bracket 30 has in an upper region an upper fastening portion 38 for said separate brake cylinder fastening means 50 with an upper aperture 38a and adapted to running substantially parallel with said bearing aperture 32a and at right angles to said shaft fastening apertures 34a, 36a.

The bearing bracket has in the lower region a lower fastening portion 39 for said separate brake cylinder fastening means 50, with first and second lower apertures 39a, 39b arranged to run parallel with and at a distance from one another and substantially parallel with said bearing aperture 32a and at right angles to said shaft fastening apertures 34a, 36a.

Figure 5:
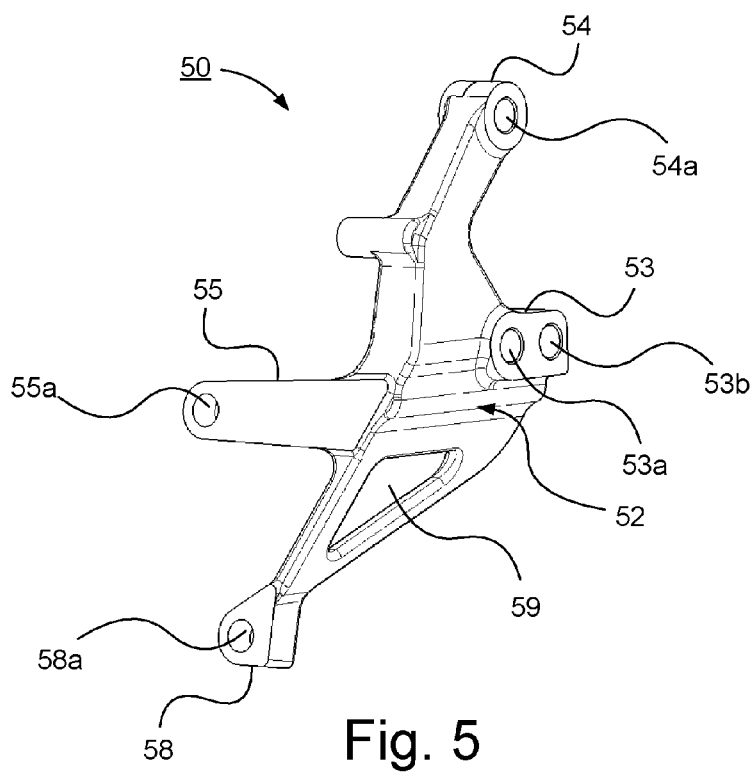
FIG. 5 is a schematic perspective view of a brake cylinder fastening means from the bearing bracket configuration in FIGS. 2a-b, FIGS. 6a-b are different schematic perspective views of an assembly package formed with the bearing bracket in FIG. 4 and comprising said eccentric shaft, a brake lever arm connected to the eccentric shaft, and an eccentric configuration.

FIG. 5 is a schematic perspective view of said brake cylinder fastening means 50 which forms part of the bearing bracket configuration in FIGS. 2a-b.

The brake cylinder fastening means 50 comprises an intermediate portion 52, an upper region situated above the intermediate portion, and a lower region situated below the intermediate portion.

The brake cylinder fastening means 50 has in the upper region an upper fastening portion 54 for said bearing bracket 30 with an upper aperture 54a intended, for fitting purposes, to be brought into line with said upper aperture 38a in the upper fastening portion 38 of the bearing bracket, which upper fastening portion 54 of the brake cylinder fastening means is arranged to be fastened to the upper fastening portion 38 of the bearing bracket by means of a fastening element in the form of a threaded connection 72 depicted in FIG. 2a.

The brake cylinder fastening means has in the intermediate portion 52 an intermediate fastening portion 53 for said bearing bracket 30, with first and second intermediate apertures 53a, 53b arranged to run parallel with and at a distance from one another and intended, for fitting purposes, to be brought into line with said first and second apertures 39a, 39b in the lower fastening portion 39 of the bearing bracket, which intermediate fastening portion 53 of the brake cylinder fastening means is arranged to be fastened to the lower fastening portion 39 of the bearing bracket by means of fastening elements in the form of threaded connections 73, 74.

The brake cylinder fastening means has in the intermediate portion 52 a brake cylinder fastening portion 55 situated substantially at right angles to the main direction of extent of the brake cylinder fastening means, for fastening the brake cylinder 10, with an aperture 55a arranged to run axially substantially at right angles to said upper aperture 54a and first and second intermediate apertures 53a, 53b. The intermediate brake cylinder fastening portion 55 of said brake cylinder fastening means is adapted to being fastened to the brake cylinder 10 by means of a fastening element in the form of a threaded connection 75.

The brake cylinder fastening means has in the lower region a lower brake cylinder fastening portion 58 for fastening said brake cylinder 10, with a lower aperture 58a arranged to run parallel with and at a distance from the aperture 55a in the intermediate brake cylinder fastening portion 55. The lower brake cylinder fastening portion 58 of said brake cylinder fastening means is adapted to being fastened to the brake cylinder 10 by means of a fastening element in the form of a threaded connection 76.

The brake cylinder fastening means has in the lower region a recess 59 for weight reduction.

Figure 6A:
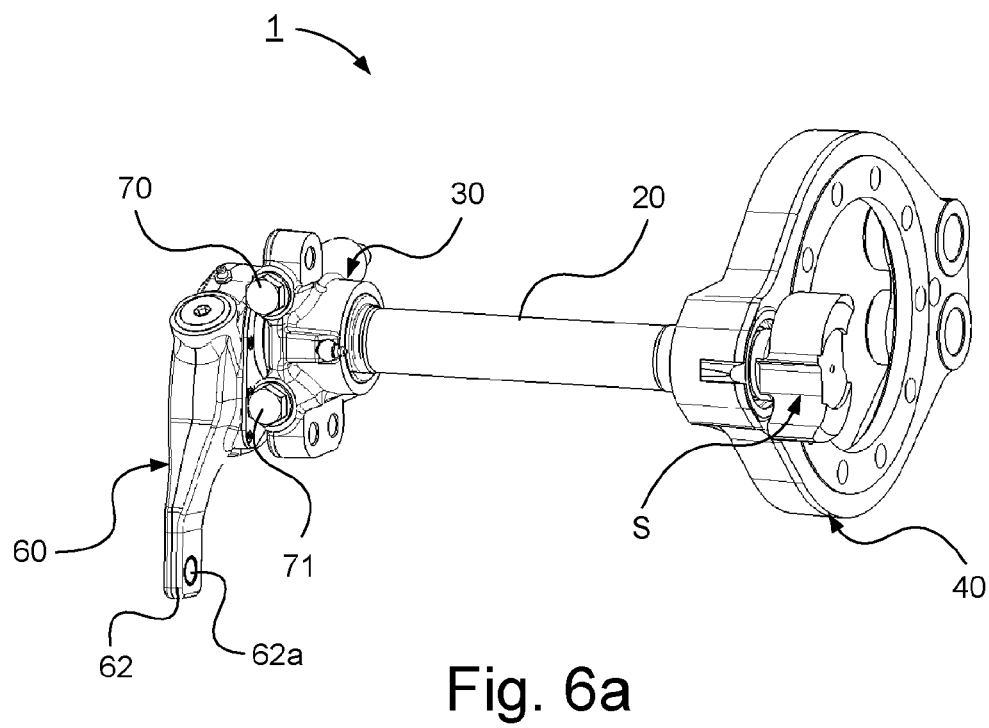
Figure 6B:
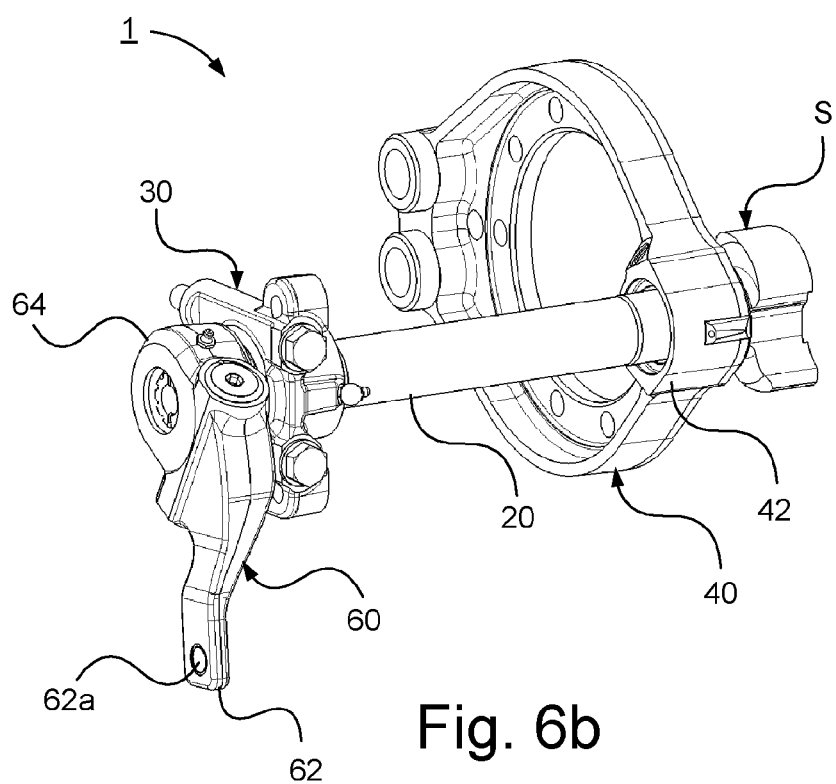

FIGS. 6a-b are different schematic perspective views of a first assembly package I formed with the bearing bracket 30 in FIG. 4 and comprising said eccentric shaft 20, a brake lever arm 60 connected to the eccentric shaft, and an eccentric configuration 40.

Said bearing bracket 30 is configured to be part of a first assembly package I comprising said eccentric shaft, a brake lever arm connected to the eccentric shaft, and said eccentric configuration.

The first assembly package I comprises accordingly said eccentric shaft 20 journalled in the bearing in said central bearing portion 32 whereby the end of the eccentric shaft opposite to that at which said cam S is situated protrudes through the bearing bracket 30 so that said brake lever arm 60 can be fastened to the protruding end of the eccentric shaft, which fastening in one variant takes the form of positive locking by splined connection.

Said eccentric shaft 20 is journalled in said bearing 32b of said eccentric configuration 40 whereby the eccentric shaft protrudes through said bearing aperture 32a so that said brake lever arm 60 can be fastened to the protruding end of the eccentric shaft.

The first stage in fitting said first assembly package I is to fit the eccentric shaft 20 in said eccentric configuration 40 so that by means of the bearing 42 the eccentric configuration journals the eccentric shaft close to the end of the shaft at which said cam S is situated. The next step is to fit the eccentric shaft 20 to the bearing bracket 30 so that by means of the bearing 32b it is journalled by the end of the bearing bracket opposite to that which is provided with the cam S. The brake lever arm 60 is then fitted to the end of the eccentric shaft close to said bearing bracket.

Assembling said first assembly package I may with advantage take place separately from an assembly line before being fitted on the assembly line, in order thereby to make fitting said drum brake more efficient.

Said first assembly package I is then arranged to be fitted to the rear axle X by said substantially annular eccentric configuration 40 being placed round the rear axle X so that said cam S is level with said undepicted brake shoes to make it possible for them to be pressed against the drum brake during braking. Said bearing bracket 30 is then adapted to being fitted to the rear axle X by applying said fastening elements 70, 71, 72 in said upper and lower shaft fastening apertures which are thus readily accessible for the operator.

Figure 7A:
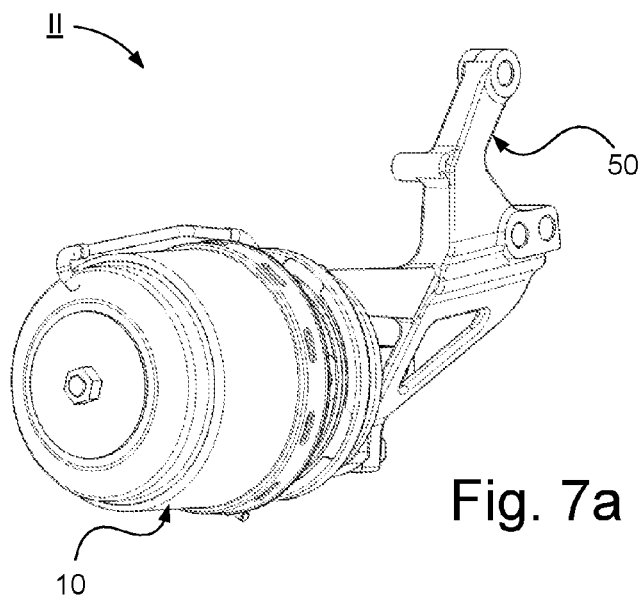
FIG. 7a is a schematic perspective view and FIGS. 7b-c are different schematic side views of an assembly package formed with the brake cylinder fastening means in FIG. 5 and comprising said brake cylinder.
Figure 7B:
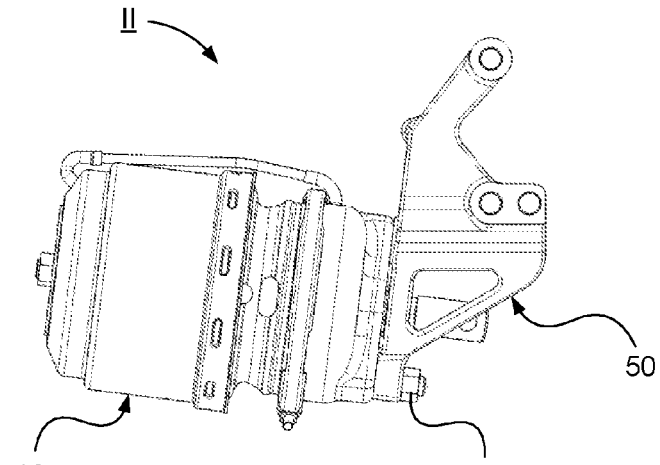
Figure 7C:
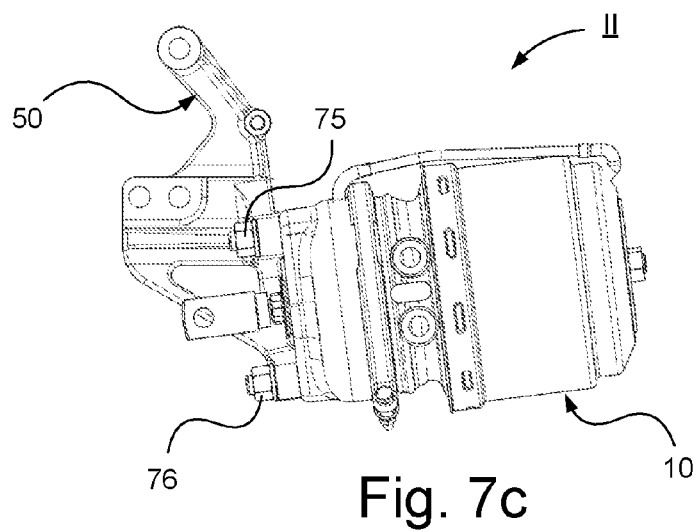

FIG. 7a is a schematic perspective view and FIGS. 7b-c are different schematic side views of a second assembly package II formed with the brake cylinder fastening means 50 in FIG. 5 and comprising said brake cylinder 10.

Said brake cylinder fastening means is configured to be part of said second assembly package II comprising said brake cylinder.

The second assembly package II comprises accordingly said brake cylinder fastened to said brake cylinder fastening means 50 as above.

Said second assembly package II is adapted to being fitted to the bearing bracket 30 by said brake cylinder fastening means being fastened to said bearing bracket as above.

Said brake lever arm 60 is then adapted to being pivotable at said lower fastening portion 62 by connection to the fastening portion 12 of the brake cylinder 10.

Assembling said second assembly package II may with advantage take place separately from an assembly line before being fitted on the assembly line, after the first assembly package I has been fitted, in order thereby to make fitting said drum brake more efficient.

A suitable method for assembling the bearing bracket configuration thus comprises the parts being preassembled in a first assembly package I as described above. This is followed by fitting assembly package I to the axle close to the drum brake, and finally by fitting assembly package II to the bearing bracket 30.

The above description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order best to explain the principles of the invention and their practical applications, and thereby enable one skilled in the art to understand the invention for different embodiments and with the various modifications appropriate to the intended use.

The invention claimed is:

1. A bearing bracket configuration for a drum brake of a motor vehicle, the bearing bracket configuration configured to fasten a brake cylinder, an eccentric shaft of said drum brake running substantially parallel with and at a distance from a rear axle of said vehicle, said bearing bracket configuration comprising:
    a one-piece structure bearing bracket having an eccentric shaft aperture positioned and configured to journal fasten the eccentric shaft, the one-piece structure bearing bracket having a fastening aperture running transverse to the eccentric shaft aperture and the fastening aperture configured to cooperate with a fastener to fasten said one-piece structure bearing bracket to said rear axle close to said drum brake; and
    a brake cylinder mounter formed as a member separate from the one-piece structure bearing bracket, the brake cylinder mounter positioned and configured to be accommodated on and fastened to the one-piece structure bearing bracket and to fasten said brake cylinder.

2. A bearing bracket configuration according to claim 1, further comprising:
    a first assembly package comprising said bearing bracket, and said eccentric shaft;
    a brake lever arm connected to said eccentric shaft, and an eccentric configuration configured substantially annularly around said rear axle and close to said drum brake.

3. A bearing bracket configuration according to claim 1, comprising a second assembly package comprising said brake cylinder fastener and said brake cylinder.

4. A drum brake comprising said one-piece structure bearing bracket configuration according to claim 1.

5. A motor vehicle comprising the bearing bracket configuration according to claim 1.

6. A method for fitting a bearing bracket configuration and a brake cylinder to a drum brake of a motor vehicle having a rear axle, said method comprising:
- fitting to the rear axle a preassembled first assembly package comprising:
- an eccentric shaft running substantially parallel with and at a distance from said rear axle;
- a one-piece structure bearing bracket having an eccentric shaft aperture positioned and configured to journal fasten the eccentric shaft, the one-piece structure bearing bracket having a fastening aperture running transverse to the eccentric shaft aperture and the fastening aperture configured to cooperate with a fastener to fasten said one-piece structure bearing bracket to said rear axle close to said drum brake;
- a brake lever arm to which one end of said eccentric shaft is connected;
- an eccentric configuration fitted to said axle close to said drum brake, said eccentric configuration comprises a substantially annular configuration around said rear axle and close to said drum brake; and then
- fitting a second assembly package comprising a brake cylinder mounter formed as a member separate from the one-piece structure bearing bracket, the brake cylinder mounter positioned and configured to be accommodated on and fastened to the one-piece structure bearing bracket and to fasten said brake cylinder to said one-piece structure bearing bracket after said first assembly package has been fitted to said axle.

7. A method according to claim 6, further comprising:
- fastening the brake cylinder to a brake cylinder fastener before fitting the brake cylinder and brake cylinder fastener to said one-piece structure bearing bracket.

8. The method of claim 6, wherein the one-piece structure bearing bracket journal fastens the eccentric shaft.

9. The bearing bracket configuration according to claim 1, wherein the one-piece structure bearing bracket comprises a bearing aperture structure configured for the journal fastening of the eccentric shaft.

* * * * *